April 7, 1964 P. A. BAKER 3,128,342

PHASE-MODULATION TRANSMITTER

Filed June 28, 1961 3 Sheets-Sheet 1

INVENTOR
P. A. BAKER
BY J. P. Kearns, Jr.
ATTORNEY

INVENTOR
P. A. BAKER
BY
J. P. Kearns, Jr
ATTORNEY

INVENTOR
P. A. BAKER
BY J. P. Kearns, Jr
ATTORNEY

United States Patent Office 3,128,342

Patented Apr. 7, 1964

3,128,342

PHASE-MODULATION TRANSMITTER

Paul A. Baker, Summit, N.J., assignor to Bell Telephone Laboratories, Incorporated, New York, N.Y., a corporation of New York Filed June 28, 1961, Ser. No. 120,312

8 Claims. (Cl. 178—66)

This invention relates to signal transmission systems and, in particular, to pulse transmission systems in which a phase-modulated carrier wave is employed.

In my copending application, Serial No. 49,544, filed August 15, 1960, I have disclosed a binary digital data transmission system in which pairs of data bits are encoded as phase shifts of a carrier wave in multiples of 45 degrees. In that system a combined digital and analog arrangement is employed to generate the required carrier phases. Specifically, pairs of keying pulses are derived under the control of the paired data to be transmitted and are employed to cause the ringing of resonant circuits tuned to the carrier frequency in the proper phase increment with respect to the prior transmitted phase.

I have since discovered that the same phase-modulated signal wave can be generated by using all-digital circuitry in a more reliable manner and with simpler logic.

It is, therefore, an object of this invention to simplify the transmission of binary data at a fixed rate over voice frequency telephone circuits.

It is a further object of this invention to generate in a single voice channel a phase-shifted carrier wave signal on which binary data are encoded as relative phase shifts, the coding being such as to produce at least a minimum phase shift for synchronization purposes regardless of the nature of the data sequence.

It is another object of this invention to produce incremental phase shifts of a carrier wave in accordance with a binary data signal by means of binary counting chains.

It is still another object of this invention to transmit binary digtal over telephone lines at high speed. Transmission rates as high as one bit per cycle of bandwidth are possible.

According to this invention a serial binary digital data signal consisting of "1" and "0" data bits is encoded on a carrier wave as a succession of incremental phase shifts of odd multiples of 45° with respect to the phase of the previous signal element. The incremental phase shift is therefore 1, 3, 5 or 7 times 45°. In order to encode by means of these four phase shifts, the incoming serial data is examined and sampled in pairs of binary digits, or "dibits," as they are called hereinafter. Since there are exactly four possible dibit combiantions: namely, 00, 01, 11 and 10; each of the four phase shifts is associated with a particular dibit combination. The phase of the carrier for a particular dibit is shifted by a predetermined increment with respect to the phase transmitted for the previous dibit. This is a relative phase shift system in contrast to a phase modulation system in which the phase shift is referred to a fixed phase reference.

Sampled data are applied to a binary counter for conversion into dibits and an output is obtained for each dibit having unlike digits. A further output is obtained from a coincidence gate for every dibit containing an initial "1" or marking digit. For each of the four possible dibits a unique combination of outputs is obtained from the binary counter and the coincidence gate. These outputs control a phase logic counting chain which includes three binary counters in tandem and counts down by eight from a dibit timing signal. The coding is such that the first phase binary counter is arranged to receive a count every dibit period, the second phase binary counter receives the output of the data binary counter and the third phase binary counter receives the output of the coincidence gate. The state of the last two phase binary counters at the end of each dibit period then determines the required carrier phase. Because a correct pulse is continually being received from the timing source, the phase logic counters in effect remember the phase being transmitted.

The carrier wave itself is generated in two separate channels, each of which includes a three-stage binary counter chain. These chains count down from an accurate pulse source at eight times the desired carrier frequency. The first stage of the two counter chains is made common to both channels because the logic circuits do not operate on the first stage. The respective channels are adjusted in phase according to the output of the phase logic circuit every other dibit period alternately. The two channels are maintained an odd multiple of 45 degrees out of phase by being driven by opposite phases of the common first stage. At the end of each dibit period the proper channel is set to a reference state and then the outputs of the phase binary counters are gated to the counters of that channel to set the proper carrier phase.

The outputs of the two channels are further amplitude modulated by a synchronized raised cosine wave at half the dibit rate in order that all phase transitions in a particular channel occur at a time when the output of that channel is at a minimum with respect to the transmission line. The modulated outputs of the two channels are combined in a summing amplifier and passed through low-pass filters to form a smooth line signal.

It is an important feature of this invention that the carrier wave is generated in a pair of binary counter chains precisely controlled from a stable oscillator and does not depend on keyed resonators.

It is another feature of this invention that the transmission of absolute phase information is unnecessary. Phase information is obtained at a receiver by comparing successive transmitted phases.

The above and other objects, features and advantages of this invention will be realized from a consideration of the following detailed description and the drawing in which.

In the course of the description certain specific data rates, timing rates and carrier frequencies will be mentioned by way of example. These are to be understood as illustrative and not limitative. For example, a serial input data rate of 2400 bits per second, a transmitted data rate of 1200 dibits per second, and a carrier frequency of 1800 cycles per second are assumed. It will be understood that the ratio between the carrier frequency and the data rate may be any integral number of eighths. A data rate of 1000 dibits per second may be carried on a wave at a frequency of 1750 cycles per second, a ratio of 14 to 8, for example.

Figure 1:
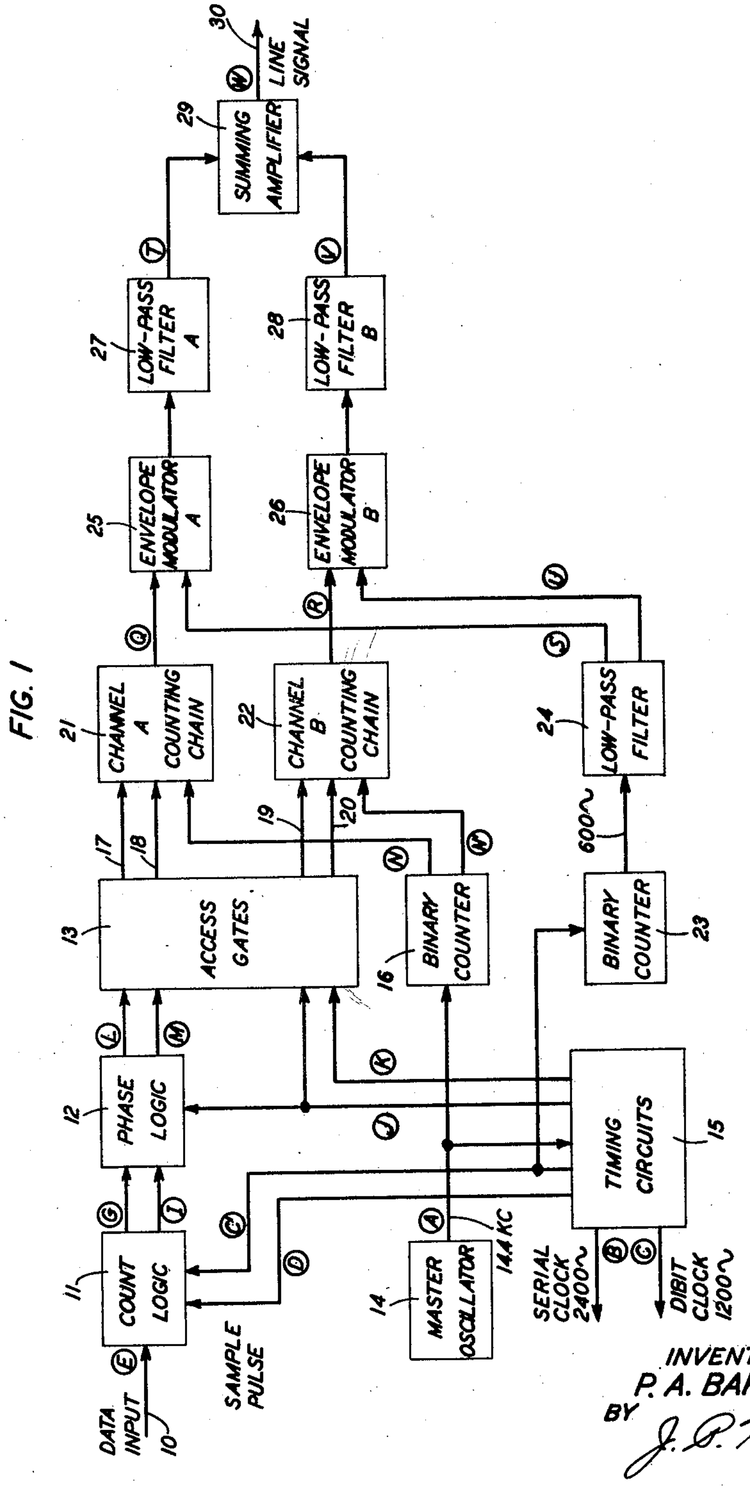
FIG. 1 is a simplified block diagram of a phase-modulated data transmitter according to this invention.

FIG. 1 is a block diagram of the transmitter for converting serial binary digital data into a phase-modulated carrier wave.

The general plan of the transmitter according to this invention somewhat resembles that disclosed in my above-mentioned application, but differs in several important respects. The phase logic is greatly simplified and the carrier wave generators are binary counting chains precisely controlled from a master oscillator. The resonant circuits used in my former application at times tended to be difficult to keep in adjustment and occasionally resulted in undesirable carrier frequency variations.

Digital data furnished serially in non-return-to-zero form on line 10 is converted into phase control signals in count logic 11. The two output signals correspond together, according to their presence or absence, to 90, 180, 270 and 0 degree changes in carrier phase. Phase logic 12 maintains a running memory of carrier phase and is adjusted for every pair of data bits to a new carrier phase according to a predetermined code. Through the medium of access gates 13 the outputs of phase logic 12 are applied alternately on leads 17, 18 and leads 19, 20 to the respective channel counting chains 21 and 22. The counting chains furnish square wave outputs at carrier frequency incrementally phase shifted under the control of signals from phase logic 12. Two counting chains are provided so that their separate outputs may be maintained an odd multiple of 45 degrees apart in phase. This permits the transition in phase in one chain to be effected while the other chain is delivering a smooth constant phase output to the line. The outputs of the counting chains are separately modulated in amplitude in envelope modulators 25 and 26 by a raised cosine wave at half the dibit period. A raised cosine wave is one which is clamped to a zero reference level. The waves applied to the respective modulators are 180 degrees out of phase and synchronized so that while the output of one counting chain is brought to zero amplitude, the other is at maximum amplitude. The phases are arranged so that the zero level occurs during the transition from one carrier phase to the next. The square wave outputs of the envelope modulators are smoothed in low-pass filters 27 and 28. The two smoothed outputs are combined in summing amplifier 29 to form a continuous signal on line 30 from which abrupt phase transitions have been suppressed.

In order to coordinate the functions of the circuits briefly described above a master oscillator 14 is provided. This may comprise a crystal oscillator operating at a frequency eight times that of the carrier. In this specific embodiment a frequency of 14,400 cycles per second is assumed. The output of the master oscillator is made available as square waves or pulses. The first countdown to 7200 cycles per second is accomplished in binary counter 16. Outputs in opposite phase are obtained from this counter to drive channel counting chains 21 and 22, which may conveniently comprise two frequency-halving counters each.

In timing circuit 15, also driven by the output of master oscillator additional countdown circuits are provided to one-sixth and one-twelfth to provide 2400 and 1200 cycle synchronized square waves for control of data input and phase and count logic circuits. The further binary counter 23 halves the 1200 cycle timing wave to a 600 cycle wave for envelope modulators 25 and 26. Low-pass filter 24 smooths the output of counter 23 into the required cosine form.

Figure 2:
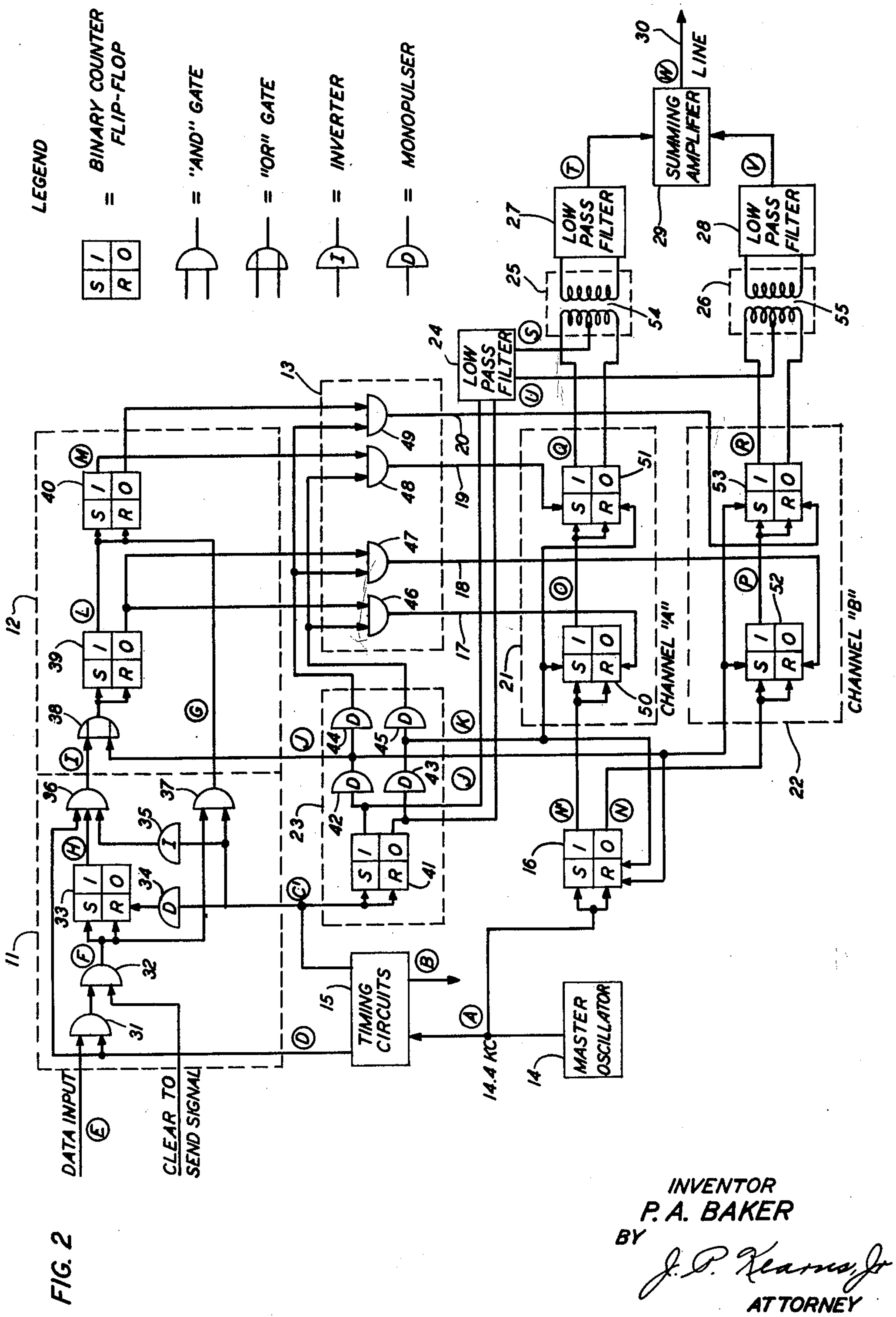
FIG. 2 is a more detailed block diagram of a phase-modulated data transmitter according to this invention including logic symbols.
Figure 3:
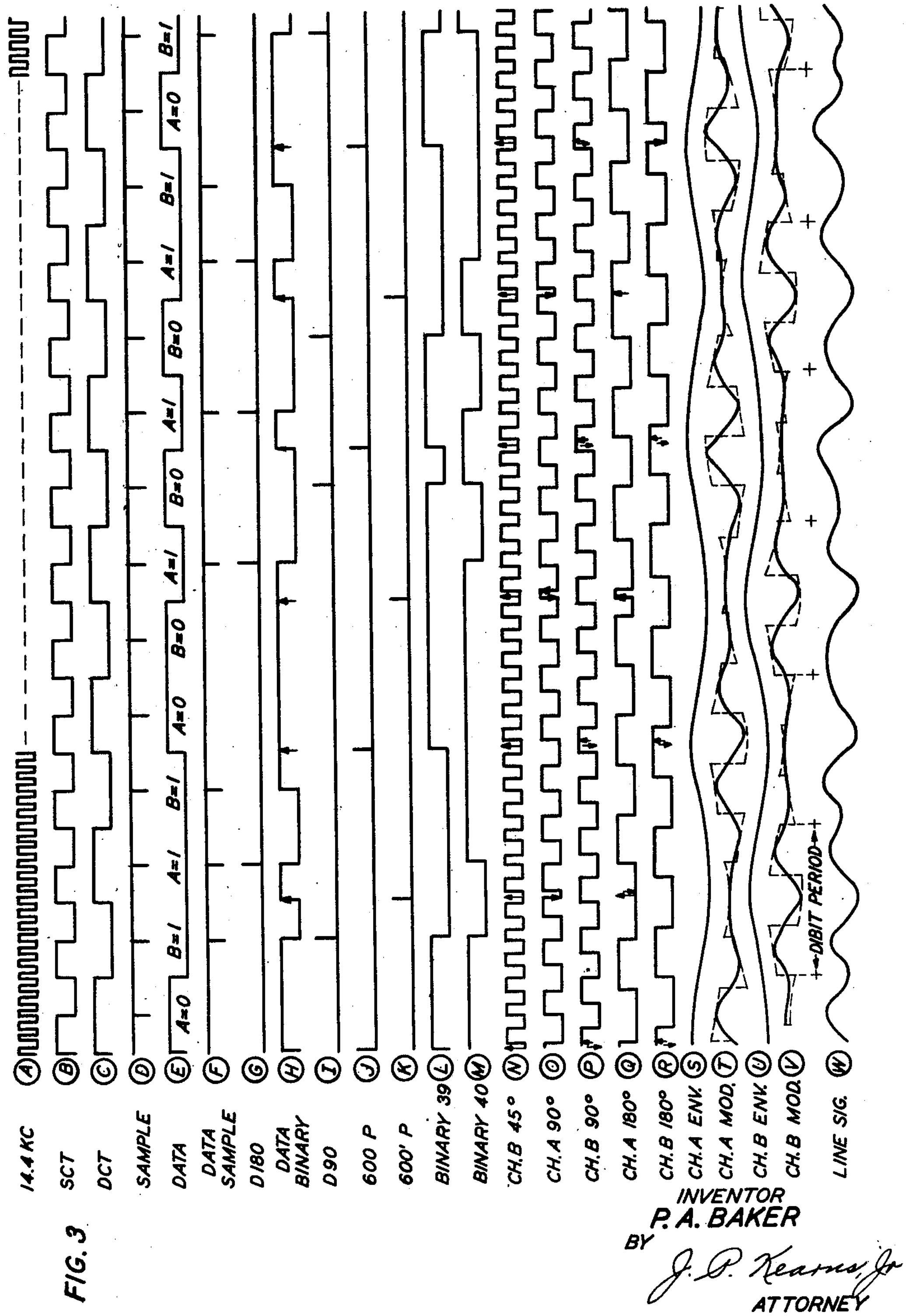
FIG. 3 is a diagram of waveforms encountered in various parts of the transmitter diagrammed in FIGS. 2 and 3.

The encircled letters shown opposite the several connecting leads refer to the correspondingly lettered waveforms in FIG. 3. These will be discussed in connection with the description of FIG. 2.

FIG. 2 shows the logic and circuit components found in the major functional blocks of FIG. 1. Dashed function blocks are designated by the same reference numerals as the corresponding blocks in FIG. 1. Encircled letters are keyed to the waveforms of FIG. 3. A logic symbol legend is shown in the upper right-hand corner of the figure.

Binary counters are represented by a square having four compartments as shown. They may be any conventional bistable circuit employing electron tubes or transistors. An input at the set input S of a given polarity produces an output at "1." Similarly, an input of the same polarity at the reset input R produces an output at "0." Where an input is shown to both S and R in parallel, a complementing output is obtained, that is, the counter changes state. Separate inputs to S or R are assumed to be properly isolated so that only the appropriate setting or resetting occurs and not a complementing action.

The AND, OR and inverting gates are any conventional logic circuits of appropriate type. Monopulser is a synonym for one-shot or monostable multivibrator.

A standard serial data input containing positive and negative polarities of the order of six volts is assumed. A negative polarity represents a mark, one or off; a positive polarity represents a space, zero, or on. For purposes of description a random data message as shown in line E of FIG. 3 is described, namely: 01110010101101. Since the count logic generates phase signals based on paired data bits or dibits, the first and second digits of each dibit are designated in FIG. 3 as A and B.

Master oscillator 14 is a conventional crystal controlled oscillator and furnishes a squared output as shown on line A of FIG. 3. For a carrier frequency of 1800 cycles per second its frequency is 14,400 cycles per second. The latter frequency is chosen for a practical embodiment because it lies near the center of the passband of telephone circuits over which the data are to be transmitted. The corresponding serial data rate is 2400 bits per second and this is obtained in timing circuit 15 by counting down by six in any well known manner. A 2400-cycle squarewave is generated as shown on line B of FIG. 3. The designation SCT indicates serial clock timing. This square wave is furnished to the data source (not shown). A dibit clock timing wave (DCT) as shown on line C of FIG. 3 is also obtained from the timing circuits by providing an additional countdown stage. The wave C′ designated on FIG. 2 is the complement of waveform C. From the waveform B is also developed a sampling pulse train shown on line D of FIG. 3 by differentiating the negative transitions of the SCT wave. The sampling pulse occurs near the center of each input data bit as shown on FIG. 3.

Count logic 11 separates the serial input data into pairs and performs a reflected binary Gray code conversion. For every data bit pair having unlike elements an output is obtained on lead I. For every initial element of a pair that is a "one" an output is obtained on lead G.

The operation is as follows. Data input on lead E is applied to AND-gate 31, which also receives a sampling pulse for each data bit. An output appears for every marking bit as shown on line F of FIG. 3. Additional AND-gate 32 is optionally provided in case a clear-to-send signal is employed and also to invert the output of gate 31 to the proper polarity. A binary counter 33 receives the data samples and executes a change of state for every marking data bit. The counter is only permitted to count up to two, however, because a resetting input is provided from monopulser 34 at the end of each dibit period. A monopulser is a one-shot multivibrator in effect giving an output for a controlled length of time after receiving a driving input. Here the input is the inverted DCT wave, each negative transition of which produces a resetting pulse in the output of monopulser 34. The output of binary counter 33 for the random data assumed is shown on line H of FIG. 3. The upwardly directed arrows represent the occurrence of resetting inputs from monopulser 34 at the end of each dibit period. The set condition is represented by negative and the reset condition, by positive polarity. The output by binary counter 33 is incident on three-input AND-gate 36, which also receives the sample pulses from lead D and the DCT wave through inverter 35. An output indicative of an odd count on binary counter 33 appears on lead I at the sampling instant once every dibit period containing a paired marking and spacing bit as shown on line I of FIG. 3. For double marking and double spacing bits binary 33 is returned to, or remains in, its reset condition.

The data sample on lead F is also incident on coincidence or AND-gate 37, which also receives the inverted DCT wave. An output appears as shown on line G of FIG. 3 every time the initial dibit element is marking.

The combined outputs on leads I and G are effectively in the reflected binary Gray code because the four possible dibit combinations, 00, 01, 10, 11 (arranged in binary numerical order) are converted to the reflected code 00, 01, 11, 10. In the latter code a change of only one bit is required to advance to the next higher digit.

Phase logic 12 has the functions of computing the initial phase to be set into the carrier wave and of remembering what phase is being transmitted. The phase logic is essentially a counting chain made up of three binary counters in tandem and hence, is capable of counting to eight. If eight counts were applied to such a chain every dibit period the logic would be in the same state at the end of each dibit period. This would means that the phase logic would set the carrier in the same phase each dibit period. However, if fewer counts are added, the phase is shifted by 45 degrees for each count added during the dibit period.

It is necessary to establish a correlation between the dibits and the phase shift to be imparted to the carrier. This is readily done in the following code.

| Dibit | Gray Code | Phase Shift, degrees | No. of Counts |
|---|---|---|---|
| 00 | 00 | 45 | 1 |
| 01 | 01 | 135 | 3 |
| 11 | 10 | 225 | 5 |
| 10 | 11 | 315 | 7 |

It is seen that the phase shift required is 45 degrees multiplied by the number of counts required. It is inconvenient and unnecessarily complex to construct a circuit which will apply three, five and seven pulses to the input of the phase logic train during a dibit period. However, control pulses may be applied as well to other than the initial stage of a binary counting chain which will have multiple effects on the output. For example, a pulse applied to the second stage of such a counter is equivalent to two pulses applied to the first stage. Similarly a pulse applied to the third stage will have the same effect as four pulses applied to the first stage.

Thus, the following chart can be constructed to show how multiple input pulses to several stages during a dibit period can achieve the effect of a train of input pulses at the first stage.

| Dibit | Gray Code | Count | Pulse First Stage | Pulse Second Stage | Pulse Third Stage |
|---|---|---|---|---|---|
| 00 | 00 | 1 | yes | no | no |
| 01 | 01 | 3 | yes | yes | no |
| 11 | 10 | 5 | yes | no | yes |
| 10 | 11 | 7 | yes | yes | yes |

It is seen that a pulse is required by the first stage independently of the code, by the second stage for those codes in which the elements differ, and by the third stage for those codes in which the first element is a "one." The Gray code becomes useful here because its left-hand bit corresponds to the third stage input and its right-hand bit, to the second stage input. Since the action of the first stage is not code critical, it is sufficient to apply a pulse to the second stage every other dibit period. Thus, the requirement for the phase logic is reduced to two counting stages.

Phase logic 12 accordingly includes two binary counters 39 and 40. The first stage is effectively provided by binary counter 41 in block 23 which counts down from the inverted DCT wave. The output from this counter through monopulser 42 is a pulse at the beginning of every other dibit period as shown on line J of FIG. 3. Counter 23 is considered apart from the phase logic because its 600-cycle output is also used to control the channel counting chains and the envelope modulators. The designation 600P on FIG. 3 denotes a pulse at a 600-cycle rate.

OR-gate 38 precedes the count input of phase logic counter 12. It passes the 600P pulses every other dibit period and the I pulses when required by the dibit code. The output of counter 39 is shown on line L of FIG. 3 for the random data assumed. The I pulses are designated D90 in FIG. 3 because their incidence causes a 90-degree shift in phase in the output of the overall phase logic.

Phase logic counter 40 counts down from the "one" output of counter 39 and also accepts additional pulses from lead G, designated D180 on FIG. 3 because a 180-degree shift in the phase of the output results from their incidence. The output for the data assumed appears on lead M of FIG. 3.

The carrier wave is generated in two separate channels as previously mentioned. These channels include binary counters driven from the output of the master oscillator. Each channel contains effectively three counters. However, since no phase information need be added to the first stage, a single stage can serve both channels. This is the stage designated 16. It produces oppositely phased "one" and "zero" outputs at 7200 cycles per second. The "zero" output is shown on line N of FIG. 3. This forms the input to the channel B counter chain. The "one" output, which is the complement of the "zero" output, forms the input to channel "A."

The channel counter chains operate in much the same way as the phase logic chains except that these chains are set into a reference state every dibit period. Each channel comprises two countdown stages. Since they are driven by opposite phases of the common counter 16, they are always out of phase by an odd multiple of 45 degrees. Channel A includes counters 50 and 51 and channel B, counters 52 and 53.

Reference-setting inputs on leads J and K are provided from the outputs of monopulsers 42 and 43 to channels A and B, respectively. In channel A counter 50 is placed in the set condition and counter 51, in the reset condition. In channel B both counters 52 and 53 are placed in the set condition. The common counter 16 is reset by inputs from leads J and K. It is seen from lines J and K of FIG. 3 that both sets of pulses occur every other dibit period, but one set occurs every even dibit period and the other set occurs every odd dibit period. Thus, while one channel is being reset, the other channel is operating under the control of the master oscillator. Immediately after each reference-setting operation an appropriate pair of AND-gates in access circuit 13 is enabled to transfer the outputs of the phase logic counters to the channel counters.

Access circuit 13 includes four AND-gates 46 through 49. AND-gates 46 and 48 are enabled by pulses from monopulser 45 which produces a pulse delayed slightly from the reference-setting pulse in the output of monopulser 43. The outputs of gates 46 and 48 are connected by way of leads 17 and 19 to resetting and setting inputs of channel A counters 50 and 51, respectively. Similarly, AND-gates 47 and 49 are enabled by pulses from monopulser 44 shortly after the reference-setting pulses from monopulser 42. The outputs of the latter AND-gates are applied by way of leads 18 and 20 to rest inputs of counters 52 and 53 in channel B.

The other inputs to gates 46 and 48 are connected to the "zero" and "one" outputs of phase logic counters 39 and 40, respectively. The other inputs to gates 47 and 49 are connected to the "zero" outputs of phase logic counters 39 and 40, respectively.

The operation of the channel counters is such that they are set to a reference state by the regularly recurring timing signals on lines J and K. Immediately thereafter, the access gates 13 are opened and, if the reference state differs from the phase logic state, the channel counters are changed accordingly. The access gates are then closed and the phase logic counters receive pulses derived from the next dibit. This information is then gated into the alternate channel binary at the end of the dibit interval. Since the phase of one channel counter chain is out of phase with that of the other by an odd multiple of 45 degrees, the channel counters are capable of being set in the phase required by the phase logic. Furthermore, since each channel counter chain is used every other dibit, two phase shifts of odd multiples of 45 degrees occur between each setting and hence, a phase shift of some multiple of 90 degrees occurs. Thus, each channel counter develops only four of the eight possible carrier phases while the other develops the other four.

The outputs of counters 50 and 52 are shown on lines O and P of FIG. 3. The outputs of counters 51 and 53 are shown on lines Q and R in FIG. 3. The arrows on lines N through R indicate reference-setting or phase logic control pulses, the left-most arrows at each triggering point being for reference-setting purposes and the other arrow being for phase logic gating purposes. It will be noted that the arrows occur at alternate times on the channel A and channel B waveforms.

The entire operation of the system for the particular data sequence assumed may be summarized in digital form in the following table.

is invariably "one" because only odd multiples of 45 degrees are permitted in this channel. The differences in absolute phase imparted to the line are shown in the next to last column. The last column indicates the count corresponding to the phase shift shown in the previous column. This column is seen to be identical to column two.

The outputs of the two channels are amplitude modulated and combined for transmission over the line 30, which may be a line of telephone grade. The phase-modulated carrier is modulated by a raised cosine envelope with a period equal to half the dibit period. This envelope is obtained from the output of 600-cycle counter 41 through low-pass filter 24. The envelope is shown on lines S and U of FIG. 3. Modulators 25 and 26 comprise transformers 54 and 55 which have a center-tapped primary winding as shown. The outputs Q and R shown as lines Q and R of FIG. 3 are applied to the primary winding and the envelope is applied to the center taps. The waveform at the secondaries of transformers 54 and 55 are shown in the dashed portion of lines T and V of FIG. 3 and the solid lines represent the result of passing through low-pass filters 27 and 28. Summing amplifier 29 combines waves T and V to obtain the line waveform shown in line W of FIG. 3. It is apparent

| Data | Count Req'd | Gray Code | 600-Cycle Input | Phase Logic | Channel "A" | Channel "B" | Line Phase Shift | Count Obtained |
|---|---|---|---|---|---|---|---|---|
| | | | 01 | | | | | |
| | | | | 00 | | 001 (45) | | |
| 01 | 3 | 01 | | | | | 135 | 3 |
| | | | | 11 | 110 (270) | | | |
| 11 | 5 | 10 | | | | | | |
| | | | | 01 | | | 225 | 5 |
| | | | 01 | | | | | |
| | | | | 00 | | 001 (45) | | |
| 00 | 1 | 00 | | | | | 45 | 1 |
| | | | | 00 | 000 (0) | | | |
| 10 | 7 | 11 | | | | | | |
| | | | | 01 | | | 315 | 7 |
| | | | 01 | | | | | |
| | | | | 00 | | 001 (45) | | |
| 10 | 7 | 11 | | | | | 315 | 7 |
| | | | | 01 | 010 (90) | | | |
| 11 | 5 | 10 | | | | | | |
| | | | | 11 | | | 225 | 5 |
| | | | 01 | | | | | |
| | | | | 10 | | 101 (225) | | |
| 01 | 3 | 01 | | | | | 135 | 3 |
| | | | | 01 | 010 (90) | | | |

The first column shows the data sequence dibit by dibit. The second column indicates the number of counts to be added to the phase logic to encode the particular data dibit. Column three indicates the condition of the I and G outputs of the count logic. The left-hand digit, if a "one," indicates a 180-degree phase shift, and the right-hand digit, a 90-degree phase shift. The fourth column indicates the 90-degree count added every other dibit effectively to produce the invariant 45-degree count per dibit required for receiver synchronization. Column five shows the state of the "one" outputs of the phase logic counters at gating intervals. The "zero" outputs are, of course, in a complementary state. The right-hand digit is the output of counter 39 and the left-hand digit, the output of counter 40. The digits in column five are obtained by successively subtracting the digits in columns three and four. Columns six and seven show the status of the respective carrier channel counters in their initial phases. The most significant digits are the conditions of the output counters. A "one" in the left-hand position indicates 180 degrees; in the center position, 90 degrees; and in the right-hand position, 45 degrees. The absolute phase represented by each binary number is shown in parentheses.

The reference condition of channel "A" is 010 or 90 degrees absolute, and the reference condition of channel "B" is 111 or 315 degrees absolute. It may be noted the right-hand digits for channel "A" are all "zeros" because only 90-degree phases are permitted in this channel. Similarly the least significant digit for channel "B"

that there are no abrupt phase transitions in the line waveform.

The absence of abrupt phase transitions is due to the fact that two channels of carrier wave generation are provided and phase logic access is permitted only when the envelope is at minimum amplitude. The signal may be amplified to a suitable level for transmission over a telephone circuit by the provision of additional amplifiers, if necessary.

The phase-modulated signal may be recovered at the other end of the line by the same type of receiver described in my aforementioned copending application.

While a specific embodiment of my invention has been described above, it will be apparent to those skilled in the art that numerous modifications within the spirit and scope of the following claims are possible. For example, the particular mode of setting and resetting the channel binary counters may differ depending on which of the "one" and "zero" outputs of the phase counters are gated to the channel counters. Other carrier frequencies and dibit rates are possible. The input signal may be two independent, but synchronized, data channels instead of the single channel used for illustrative purposes.

What is claimed is:

1. In a transmitter for a carrier wave phase-modulated in accordance with binary digital data on eight discrete phases the improvement comprising a source of stable oscillations at eight times the frequency of said carrier wave, a pair of plural-stage binary frequency dividers for counting down from the output of said source to two channels of carrier wave frequency phase displaced by an odd multiple of 45 degrees, each channel being capable of producing four of said eight phases, a source of paired binary data, a clock source for establishing a synchronous rate for sampling said data, means for resetting the binary dividers in said two channels alternately to a reference condition under the control of said clock source, phase-determining means driven by the output of said data source at said synchronous rate for inserting additional pulses into one or more stages of the binary dividers in each of said channels immediately after the operation of said resetting means to establish a carrier phase shift unique to each paired data combination, and means for combining the outputs of said two channels to form a single line signal at the frequency of said carrier wave.

2. Apparatus for incrementally phase-shifting a carrier wave in accordance with a binary data signal comprising pulse generator means furnishing an output harmonically related to the frequency of said carrier wave, a source of paired binary data dibits occurring at a synchronous rate, count logic means for producing a first output whenever a data pair contains unlike elements and a second output whenever the initial data pair digit is a marking element, phase logic means under the control of the first and second outputs of said count logic means for establishing an initial phase for said carrier wave at each dibit interval, two channels counting down from the outputs of said pulse generator means to the frequency of said carrier wave, the phase relationship between said two channels being maintained at an odd multiple of 45 electrical degrees, means for setting the phases of said two channels alternately to a reference state every dibit period, and means for gating the output of said phase logic means alternately to said channels to control the initial phase thereof with respect to the reference state, and means for adding the outputs of said two channels to form a single phase-modulated line signal.

3. Apparatus for incrementally phase-shifting a carrier wave with smooth transitions in accordance with a binary data signal comprising a stable pulse generator having an output harmonically related to the frequency of said carrier wave, a pair of plural-stage frequency division means for producing square waves at a submultiple of the repetition rate of said pulse generator equal to the frequency of said carrier wave, the phase difference between the outputs of said division means being maintained at an odd multiple of 45 electrical degrees, a source of serial binary data occurring at a synchronous rate, phase-determining logic means responsive to successive pairs of data bits from said source for providing outputs representative of predetermined phase shifts correlated with the data pair to be transmitted, means operating at one-fourth said synchronous rate for alternately setting the output phases of said division means to a reference state, means for effecting phase transitions in one division means while the other division means generates a constant phase comprising means for alternately gating the outputs of said phase logic means to one or more stages of each of said division means, means for amplitude modulating the outputs of said division means at one-fourth said synchronous rate so that phase transitions occur at minimum amplitude, means for combining the amplitude-modulated outputs of said division means into one signal, and a low-pass filter for converting the output of said combining means into a smooth line signal.

4. A phase-modulated carrier wave transmission system for binary digital data comprising a source of said binary data, a data timing source, a first binary counter for producing an output when two successive data bits are unlike, a coincidence gate enabled every other cycle of said timing source output for producing an output whenever an odd numbered bit is a mark, a three-stage logic chain of binary counters counting down from the output of said timing source to establish the synchronous rate at which data is to be transmitted, the outputs of the last two stages being representative of the phase of the carrier wave, means for inserting the outputs of said first binary counter and said coincidence gate into the inputs of the second last and last stages, respectively, of said logic chain to alter the phase of the carrier wave in accordance with the data to be transmitted, a stable frequency source having a direct and an inverted output, a first channel of binary counters counting down from the direct output of said stable source to the frequency of said carrier wave, a second channel of binary counters counting down from the inverted output of said stable source to the frequency of said carrier wave, the relative phases of the outputs of said first and second channels being therefore an odd multiple of 45 degrees at the frequency of the carrier wave, means for setting the outputs of said first and second channels alternately to a reference state at half said synchronous rate, means for gating the outputs of the last two stages of said three-stage logic chain to the inputs of the last two stages of said first and second channels alternately immediately after the operation of said setting means to establish the initial carrier phase for each pair of data bits to be transmitted, means for applying a cosine wave at half said synchronous rate alternately to the outputs of said first and second channels to suppress phase transitions in the outputs of said channels, and means for combining the outputs of said first and second channels into a continuous line signal.

5. In combination, a master oscillator, first multistage frequency-dividing means driven by said oscillator to produce a carrier wave having a frequency subharmonically related to the frequency of said oscillator, second multistage frequency-dividing means driven by said oscillator to produce a carrier wave of the same frequency as that of said first dividing means but displaced in phase by an odd multiple of 45 electrical degrees, a source of binary digital data occurring at another subharmonic of the frequency of said oscillator means, computing means responsive to said data taken in pairs for establishing phase-setting signals for said first and second dividing means, means for alternately setting said first and second dividing means to a reference phase at half the data rate, means for alternately gating the signals from said computing means to one or more stages of each of said first and second dividing means immediately after the operations of said setting means, and means for combining the outputs of said first and second dividing means to form a data-encoding phase-modulated line signal.

6. An arrangement for incrementally advancing the phase of a square wave in accordance with a random bipolar pulsed signal wave comprising means for generating pulses at a fixed rate, a source of pulsed message signals occurring at said fixed rate, plural stage repetition-rate division means for dividing the repetition rate of said fixed rate pulses to a given submultiple to provide said square wave, means for encoding said pulsed message signals in pairs as one of four quadrature phase shift signals, means responsive to said encoding means for periodically inserting an additional pulse into the last stage of said division means to effect a reversal of phase, an additional pulse into the second last stage of said division means to effect a 90-degree change of phase, and additional pulses into both of the second last and last stages of said division means simultaneously to effect a 270-degree change of phase of said square wave.

7. The arrangement according to claim 6 in which said encoding means comprises a bistable counting circuit receiving said pulsed signals for providing the additional pulse applied to the second last stage of said division means, means for resetting said counting circuit to a reference condition at half said fixed rate whereby said counting circuit just prior to being reset indicates that a particular pulse pair includes like or unlike elements, a coincidence gate receiving said pulsed signals for providing the additional pulse applied to the last stage of said division means, and means for enabling said coincidence gate at half said fixed rate whereby the output of said gate indicates whether the odd pulses of said signal are of a particular polarity.

8. An arrangement for incrementally phase-modulating an output frequency in response to bits of input binary data comprising pulse generating means, first and second plural-stage repetition rate division means for dividing the repetition rate of said generated pulses to that of said output wave, the relative phases between said first and second division means being maintained at an odd multiple of 45 electrical degrees, phase logic means for providing a predetermined number of additional input signals in response to respective bits of input data, means for periodically setting the state of all the stages in each of said division means in rotation to a reference condition, means for periodically in rotation inserting said additional input signals into one or more stages of said division means between pulses derived from said generating means, means for continuously amplitude modulating the outputs of said division means in synchronism with the insertion of said additional signals so that phase transitions occur at minimum amplitude, means for combining the outputs of said modulating means into a single line signal at a single frequency, and filter means for passing only the fundamental frequency of said output wave.

References Cited in the file of this patent

UNITED STATES PATENTS

| | | |
|---|---|---|
| 2,870,431 | Babcock | Jan. 20, 1959 |
| 2,905,812 | Doelz et al. | Sept. 22, 1959 |
| 2,969,430 | Barry | Jan. 24, 1961 |
| 2,977,417 | Doelz | Mar. 28, 1961 |